March 28, 1950     M. P. CRESS     2,501,887
DISHWASHER
Filed Aug. 21, 1945     2 Sheets-Sheet 1
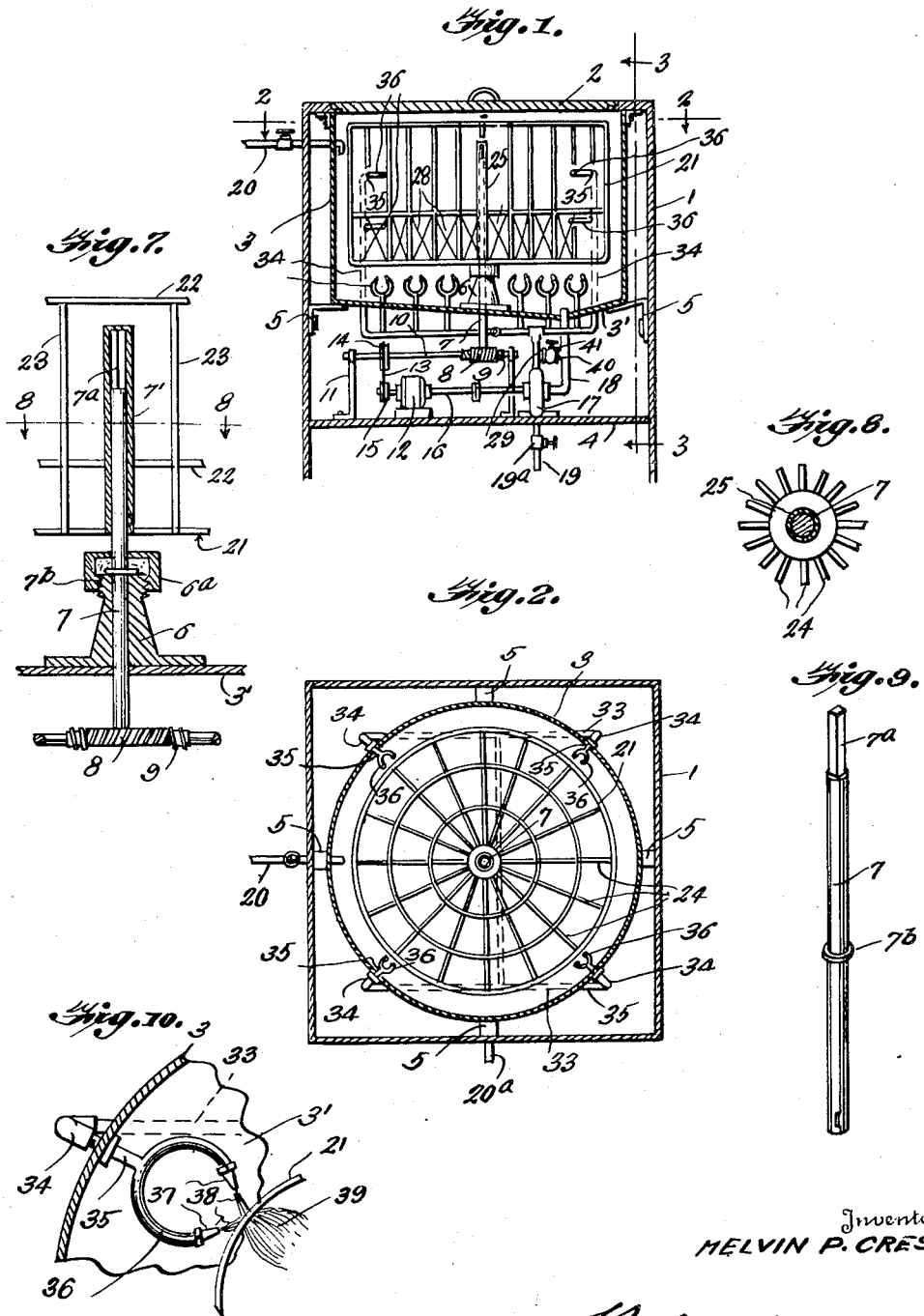
Inventor
MELVIN P. CRESS March 28, 1950　　　　　M. P. CRESS　　　　　2,501,887
DISHWASHER Filed Aug. 21, 1945　　　　　　　　　　　　　2 Sheets-Sheet 2

Inventor
MELVIN P. CRESS

By
Attorney

Patented Mar. 28, 1950

2,501,887

UNITED STATES PATENT OFFICE 2,501,887

DISHWASHER

Melvin P. Cress, Mena, Ark.

Application August 21, 1945, Serial No. 611,812

1 Claim. (Cl. 134—148)

This invention relates to a dish washer and it is one object to provide a dish washer wherein dishes and silverware are placed in a basket and sprayed with soapy water, or rinsing water, while the basket is rotated about a vertical axis in order to permit jets of water discharged from nozzles carried by water pipes to strike all of the dishes and silverware in the basket and thoroughly clean the same.

Another object of the invention is to so mount the basket upon a vertical shaft that it will turn with the shaft but may be lifted from the shaft and withdrawn through an opening in the top of the tub or vat in which it is disposed after dishes have been washed.

Another object is to so arrange pipes of the water line that jets of water will be discharged upwardly through the bottom of the basket and also toward the center of the basket from sides thereof, thus causing the water jets to strike all portions of the dishes and silverware in the basket and thoroughly clean them as the basket turns in the vat or tub.

Another object is to provide a dish washer wherein the vat or tub is supported in upwardly spaced relation to the bottom of a housing or casing, thus providing space under the vat to accommodate a motor, pump and other mechanism essential to operation of the dish washer.

Another object is to provide a basket so formed that a relatively large number of dishes and the like may be accommodated and quickly washed.

Another object is to so arrange the nozzles of the water distributing system that when water is discharged from companion nozzles the streams of water will strike each other and form a flat stream which increases in width as it moves inwardly of the basket and thus make contact with a large surface when it strikes dishes in the basket.

Another object is to provide means for controlling the pressure on the jets of water and eliminate likelihood of dishes being broken by being overturned in the basket.

And a still further object is to provide a dish washer which is simple in construction, very efficient in operation and not liable to get out of order when in use.

In the accompanying drawings:

Fig. 1 is a sectional view taken vertically through the improved dish washer.

Fig. 2 is a sectional view taken horizontally through the dish washer on the line 2—2 of Fig. 1.

Fig. 7 is a fragmentary view on an enlarged scale showing the manner in which the basket is mounted.

Fig. 8 is a fragmentary sectional view taken through the basket on the line 8—8 of Fig. 7.

Fig. 9 is a perspective view of the shaft for carrying the basket.

Fig. 10 is a fragmentary view showing the manner in which water is discharged from the nozzles of the water distributing pipes.

Figure 3:
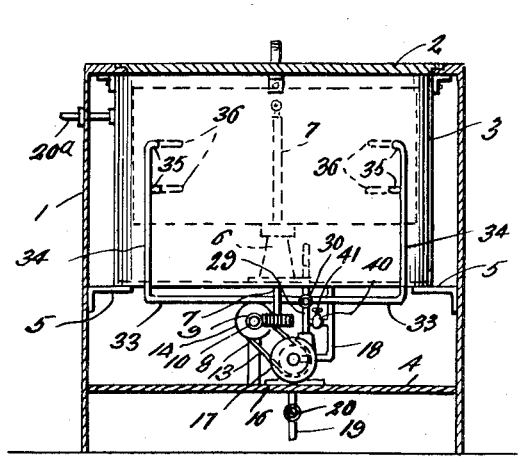
Fig. 3 is a sectional view taken on the line 3—3 of Fig. 1.
Figure 4:
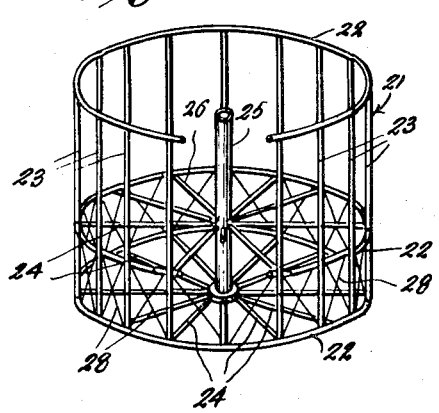
Fig. 4 is a perspective view of the basket.
Figure 5:
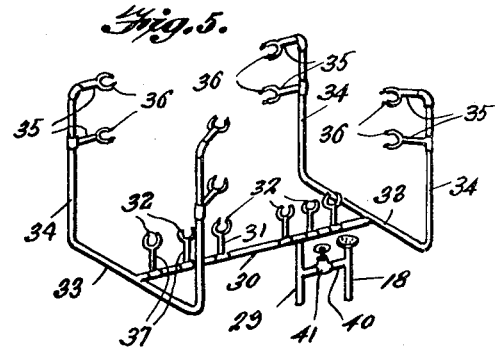
Fig. 5 is a perspective view of the water pipes and nozzles.
Figure 6:
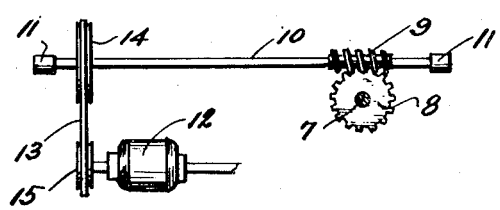
Fig. 6 is a fragmentary view showing a portion of the operating mechanism.

This improved dish washer has a cabinet 1, which may be formed of metal or other suitable material and is open at its top, a cover 2 being provided for tightly closing this opening when the washer is in use. A vat or tub 3 is housed in the cabinet and supported in upwardly spaced relation to the bottom 4 of the cabinet and supported in upwardly spaced relation to the bottom 4 of the cabinet by brackets 5, or in any other desired manner, and, while this tub has been shown circular in Fig. 2, it will be understood that it may be square or any other shape desired. The open upper end of the tub registers with the opening in the top of the cabinet. A frusto-conical bearing block 6 is rigidly mounted at the center of the bottom 3' of the tub 3 and through this bottom is rotatably mounted a vertically extending shaft or post 7 having its upper portion 7$^a$ squared and having its lower portion projecting downwardly from the bottom of the tub and carrying a worm gear 8 at its lower end. A thrust collar 7$^b$ is carried by the shaft 7 and rests upon the upper end of block 6, a packing gland 6$^a$ being screwed upon the upper end of the block and serving to prevent leakage of water through the bore of the block. The worm gear meshes with a worm 9 carried by a shaft 10 which is rotatably mounted in bearing brackets 11 rising from the bottom of the cabinet and, when the shaft is rotated, rotary motion will be transmitted to the post 7. The shaft 10 is driven from a motor 12 by a belt 13 trained about pulley wheels 14 and 15 carried by the shaft 10 and the motor shaft 16, which also operates a centrifugal pump 17 having an inlet pipe 18 mounted through the bottom of the tub. The pump also has a drain pipe 19 controlled by a valve 19$^a$ and through which water is drained from the tub when the tub is to be emptied. Hot water is fed to the tub through a valve controlled pipe 20 and a vent 20ª is provided for escape of excess steam.

The dishes and silverware to be washed are placed in a basket 21 formed of interconnected rings 22 and vertically extending rods 23, the rings being braced by rods 24 extending between the rings and a sleeve 25. This sleeve is disposed vertically at the center of the basket and is squared in crossed section for a portion of its length from its upper end so that when the sleeve moves downwardly into place about the post 7 its squared portion will fit closely about the squared portion 7ª of the post and cause the basket to turn with the post. The diameter of the basket is such that it may be inserted and removed through the opening in the top of the cabinet when the cover is removed. The dishes placed in the basket may be set on edge or stacked in any desired position provided there is ample space between them for water to circulate freely and thoroughly wash dirt therefrom. The silverware may be placed on the shelf 26 formed in the basket by upper ones of the radially extending rods 24, or may be placed in foraminous trays set upon the shelf. The upper end of the sleeve 25 is closed and rests upon the upper end of the shaft 7 so that the basket will be held out of contact with the packing gland 6ª and allowed to turn freely with the shaft. Crossed wires 28 between the shelf 26 and the bottom of the basket form a barrier to prevent articles from slipping out of the basket. The shelf may be removably mounted in the basket so that it may be taken out if necessary or desired.

During the use of the dish washer, soapy water or clear rinsing water is to be discharged against the dishes and silverware in the basket and circulated through the tub 3. This water is circulated by the pump, and referring to Figs. 1 and 3, it will be seen that the pump has an outlet or discharge pipe 29 leading to a distributing pipe 30 which extends horizontally in the cabinet under the tub or vat and carries upstanding discharge pipes 31 which pass through the bottom of the tub and carry nozzles 32. The pipe 30 has its ends connected with pipes 33 extending transversely thereof and formed with upwardly projecting arms 34 and these portions 34 of pipes 33 are disposed externally of the tub and carry discharge pipes 35 which pass through walls of the tub, as shown in Fig. 10 and carry nozzles 36 at their ends. The nozzles 32 and 36 are of duplicate construction and each is curved so that it is arcuate to an extent greater than a half circle and, at its ends, carries removable tips 37 disposed in such angular relation to each other that jets of water 38 discharge from the tips, intersect, and then merge and spread transversely to firm flat sprays 39 which may be referred to as fish tails. These flat sprays are directed upwardly from the lower nozzles 32 and inwardly of the basket from the side nozzles 36 toward the sleeve 25. Therefore, the water will be so discharged from the nozzles that they will strike the dishes and silverware as flat streams and act very effectively to remove food particles or grease when the dish water is in use and the basket rotates in the tub. A pipe 40 establishes communication between the inlet pipe 18 and the outlet pipe 29 so that water may flow from one to another and, since a valve 41 is mounted in this pipe 40, flow of water through the pipe may be controlled. Therefore, pressure upon the jets of water discharged from the nozzles may be regulated and the sprays 39 prevented from striking the dishes with sufficient force to turn them over and cause the dishes to be broken while being washed.

What is claimed is:

A dish washer comprising a tub open at its top for insertion and removal of a basket for holding articles to be washed, means for rotatably supporting the basket in the tub and holding the basket in upwardly spaced relation to the bottom of the tub, a pump under the tub having an inlet pipe communicating with the tub through the bottom thereof, an outlet pipe extending upwardly from said pump and having its upper end spaced downwardly from the bottom of the tub, a distributing pipe extending horizontally under the tub in downwardly spaced relation thereto and communicating with the upper end of the outlet pipe, branch pipes extending laterally from said distributor pipe and having portions extending upwardly in position to extend along side portions of the basket and carrying nozzles disposed inwardly of the tub in position for discharging water into the basket through side portions thereof, and discharge pipes extending upwardly from the distributor pipe and into the tub through the bottom thereof and provided at their upper ends with nozzles spaced upwardly from the bottom a distance disposing them under the basket in position for discharging water upwardly into the basket through the bottom of the basket.

MELVIN P. CRESS.

REFERENCES CITED

The following references are of record in the file of this patent:

UNITED STATES PATENTS

| Number | Name | Date |
|---|---|---|
| 386,626 | Coventry | July 24, 1888 |
| 1,210,232 | Thomas | Dec. 26, 1916 |
| 1,667,119 | Kehoe | Apr. 24, 1928 |
| 2,081,636 | Minors | May 25, 1937 |
| 2,187,891 | Poluzzi | Jan. 23, 1940 |
| 2,216,388 | Hampel | Oct. 1, 1940 |
| 2,315,572 | Wilson | Apr. 6, 1943 |

FOREIGN PATENTS

| Number | Country | Date |
|---|---|---|
| 376,033 | France | May 30, 1907 |